(12) United States Patent
Roux et al.

(10) Patent No.: US 11,350,739 B2
(45) Date of Patent: Jun. 7, 2022

(54) GLASS CERAMIC PLATE FOR WORKTOP OR FURNITURE

(71) Applicant: EUROKERA S.N.C., Chateau Thierry (FR)

(72) Inventors: Nicolas Roux, Chateau-Thierry (FR); Pablo Vilato, Paris (FR); Franck Demol, Reims (FR); Gregory Debreyer, Montcourt Fromonville (FR); Michael Ravel, Barzy sur Marne (FR); Bertrand Charpentier, Chateau-Thierry (FR)

(73) Assignee: EUROKERA S.N.C., Chateau Thieny (FR)

( * ) Notice: Subject to any disclaimer, the term of this patent is extended or adjusted under 35 U.S.C. 154(b) by 0 days.

(21) Appl. No.: 16/095,571

(22) PCT Filed: Apr. 24, 2017

(86) PCT No.: PCT/FR2017/050963
§ 371 (c)(1),
(2) Date: Oct. 22, 2018

(87) PCT Pub. No.: WO2017/187070
PCT Pub. Date: Nov. 2, 2017

(65) Prior Publication Data
US 2019/0090629 A1    Mar. 28, 2019

(30) Foreign Application Priority Data

Apr. 25, 2016 (FR) ...................................... 1653642

(51) Int. Cl.
*A47B 13/12* (2006.01)
*C03C 17/00* (2006.01)
(Continued)

(52) U.S. Cl.
CPC ............ *A47B 13/12* (2013.01); *C03C 17/007* (2013.01); *F16B 1/00* (2013.01); *F24C 7/067* (2013.01);
(Continued)

(58) Field of Classification Search
CPC ............ A47B 13/12; A47B 2200/0078; A47B 2200/008; A47B 2200/0084; A47B 96/18;
(Continued)

(56) References Cited

U.S. PATENT DOCUMENTS 6,369,370 B1   4/2002  Eskildsen
6,498,326 B1   12/2002 Knappe
(Continued)

FOREIGN PATENT DOCUMENTS

EP   1 1 06 931 A2   6/2001
EP   1 869 368       10/2006
(Continued)

OTHER PUBLICATIONS

[NPL-1] "D11SH", K&J Magnetics, Inc. (Apr. 18, 2015) <https://www.kjmagnetics.com/proddetail.asp?prod=D11SH&cat=167>. (Year: 2015).*

(Continued)

*Primary Examiner* — David Sample
*Assistant Examiner* — Donald M Flores, Jr.
(74) *Attorney, Agent, or Firm* — Oblon, McClelland, Maier & Neustadt, L.L.P.

(57) ABSTRACT

A novel glass ceramic sheet intended in particular to be used as the surface of a furniture unit or as a worktop, the sheet including, at least in one of its faces, in particular its lower face, at least one connection element of a height less than or equal to 10 cm, the connection element including at least one part that is magnetized or at least one part made of a material (Continued)

capable of being attracted by a magnet. Furniture or a household equipment incorporating the glass ceramic sheet.

19 Claims, 3 Drawing Sheets

(51) Int. Cl.
*F16B 1/00* (2006.01)
*F24C 7/06* (2006.01)
*H05B 6/14* (2006.01)
*F24C 15/10* (2006.01)
*A47B 96/18* (2006.01)

(52) U.S. Cl.
CPC .......... *F24C 15/102* (2013.01); *F24C 15/108* (2013.01); *H05B 6/145* (2013.01); *A47B 96/18* (2013.01); *A47B 2200/008* (2013.01); *A47B 2200/0078* (2013.01); *A47B 2200/0084* (2013.01); *C03C 2217/42* (2013.01); *F16B 2001/0035* (2013.01); *H05B 2206/022* (2013.01); *Y10T 428/24* (2015.01); *Y10T 428/24008* (2015.01)

(58) Field of Classification Search
CPC .. F16B 1/00; F16B 2001/0035; Y10T 428/24; Y10T 428/24008; H05B 2206/022; H05B 6/145; H05B 6/1209; F24C 7/067; F24C 15/102; F24C 15/108
See application file for complete search history.

(56) References Cited

U.S. PATENT DOCUMENTS

| | | | |
|---|---|---|---|
| 2003/0029560 A1* | 2/2003 | Wegert | B44F 1/04 156/329 |
| 2005/0189820 A1 | 9/2005 | Blumenthal et al. | |
| 2008/0029369 A1 | 2/2008 | Weigold | |
| 2008/0264931 A1* | 10/2008 | Vilato | C03C 17/00 219/622 |
| 2012/0138596 A1* | 6/2012 | Alonso Esteban | C03C 17/36 219/600 |
| 2014/0353455 A1* | 12/2014 | Floyd | B29C 66/4722 248/467 |
| 2015/0197444 A1* | 7/2015 | Comte | C03C 3/087 428/220 |
| 2017/0114547 A1* | 4/2017 | Boyd | F16B 1/00 |

FOREIGN PATENT DOCUMENTS

| | | | |
|---|---|---|---|
| EP | 1845069 A1 * | 10/2007 | .......... C03C 17/002 |
| EP | 2 1 08 893 A2 | 10/2009 | |
| EP | 2108893 A2 * | 10/2009 | ............. F24C 15/10 |
| EP | 2 865 949 A1 | 4/2015 | |
| WO | WO 98/41064 A2 | 9/1998 | |
| WO | WO 2004/019150 A1 | 3/2004 | |

OTHER PUBLICATIONS

Chevrier et al. (EP 1845069 A1). Oct. 17, 2007 (EPO—machine translation to English). (Year: 2007).*
International Search Report dated Jul. 25, 2017 in PCT/FR2017/050963 filed on Apr. 24, 2017.

* cited by examiner

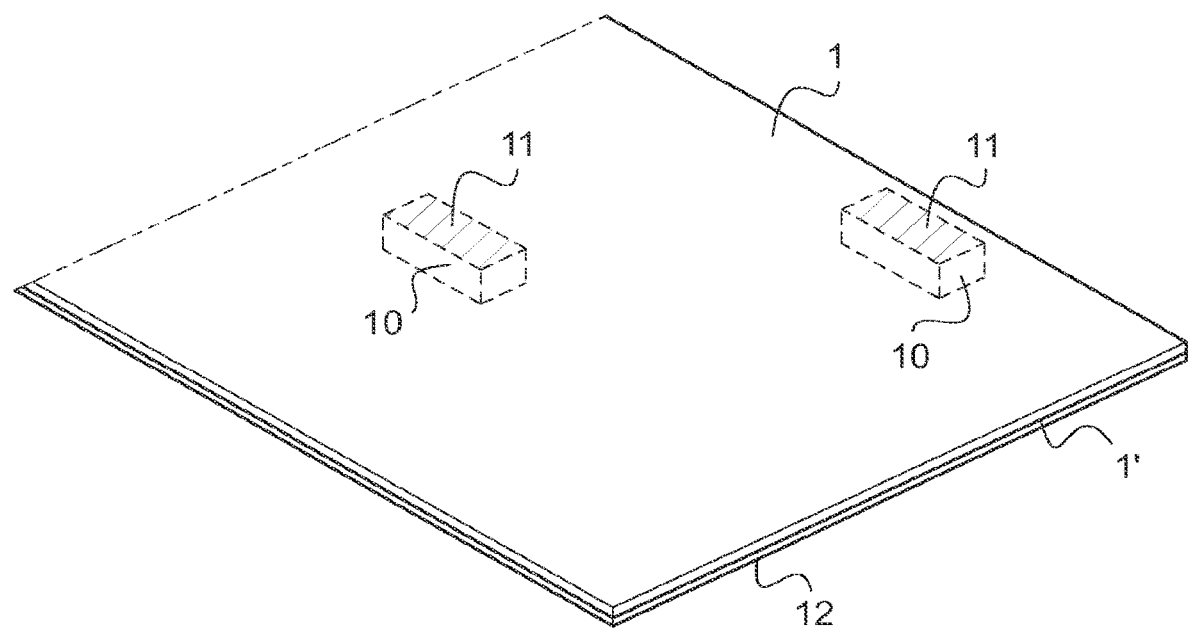
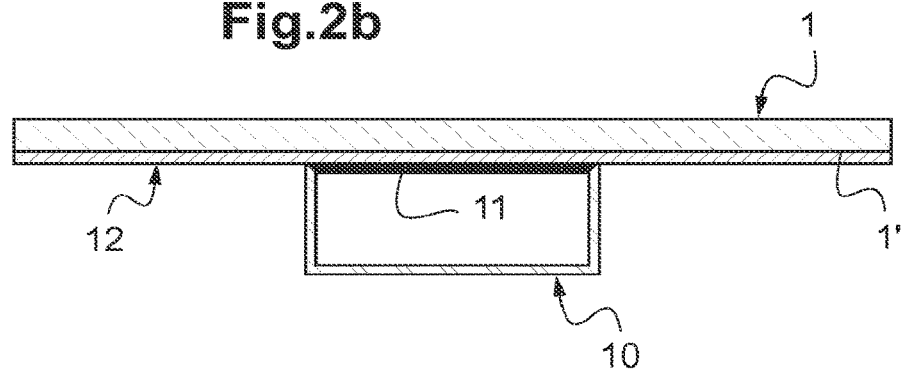

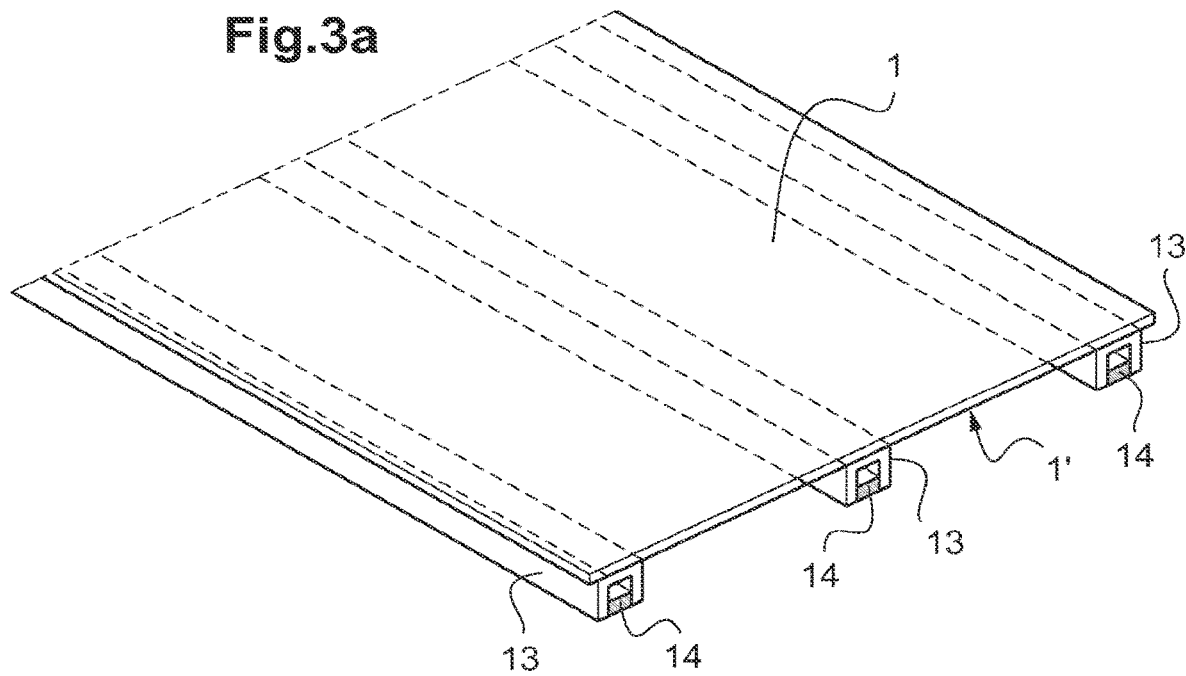
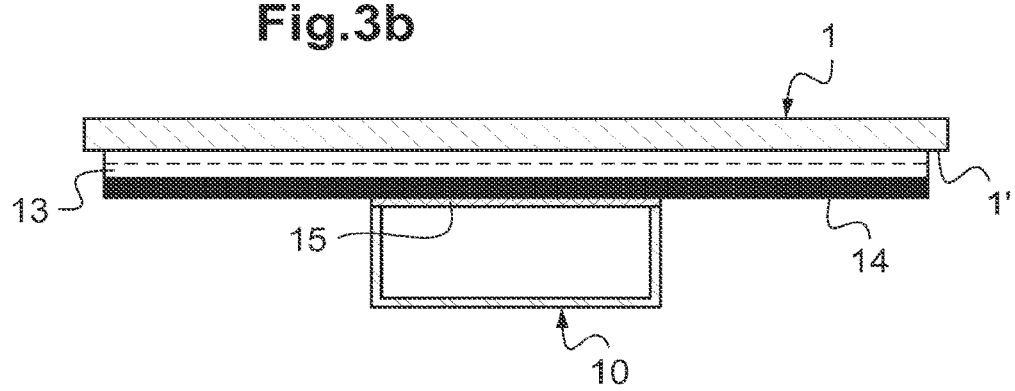

GLASS CERAMIC PLATE FOR WORKTOP OR FURNITURE

The present invention relates to a sheet (made) of glass ceramic, particularly intended to serve as a worktop or a surface (in particular horizontal) of a furniture unit, this sheet in particular being of large dimensions, the invention also relating to the furniture unit thus formed.

Glass ceramic has been used in particular for several years to form glass ceramic hobs, which have been very successful with housekeeping experts, manufacturers of household electrical appliances and users alike, because of their attractive appearance and ease of cleaning.

Worktops themselves are generally made from other materials, for example wood, quartz, Cohan®, etc., although the use of glass ceramic sheets from which to make these worktops, although leading to problems specific to that material, is proving particularly attractive.

A glass ceramic starts out as a glass, referred to as a precursor glass (or parent glass or green-glass), the specific chemical composition of which makes it possible, through suitable heat treatments referred to as ceramization, to bring about controlled crystallization. This partially crystallized specific structure gives the glass ceramic unique properties.

Each glass ceramic product is the result of specific studies and numerous tests, given that it is very tricky to make modifications to glass ceramics and/or to the method by which they are obtained without risking an unfavorable effect on the sought-after properties: for example in its usual duty as a hob, a glass ceramic sheet generally needs to have transmission in the visible domain that is both low enough to conceal the underlying heating elements at rest, and high enough that the user can visually detect when said elements are in operation, for safety purposes, and/or can read any displays there might be. Glass ceramic sheets must also have sufficient mechanical strength as required for their use, and in particular and all the more so when they are large in size, and in particular, in the field of household electrical appliances, they must exhibit (as defined for example by standard EN 60335-2-6 for their usual duty as hobs) good ability to withstand pressure, impacts (for supporting, and tolerating the droppage of, utensils, etc.), etc.

In order to fulfill the function or functions assigned thereto, the glass ceramic sheet is generally equipped with (decorative or functional) accessories or additional elements needed for its end purpose (for example with heating elements or with a control strip in the case of hobs), particularly with electronic components, said elements or accessories generally being fixed to the sheet permanently, by being set into a housing provided in the sheet for that purpose, and/or possibly by being bonded to a region distinct from the heating regions, where present. The position and choice of accessories are thus fixed in advance, and once the sheet and its accessories are assembled, if an element is defective, the entire assembly has to be dismantled using special-purpose tooling, or the repair entails exchanging the entire sheet or assembly.

Furthermore, for a sheet of large dimensions, the weight of the glass ceramic is great and prevents said sheet from being handled easily in the event of problems; as a result, the use of glass ceramic combined with electronic components from which to make worktops or surfaces of furniture units that are interactive and/or multifunctional presents problems in terms of the fitting or removal of the components, in particular when it is installations of a modifiable nature that are to be created.

The present invention has therefore sought to develop a sheet that allows simpler fitting and removal particularly of electronic equipment, suited to the intended uses of this sheet (in particular in a furniture unit and/or as a worktop), particularly a sheet that allows various types of accessories to be fitted or removed at will without the use of special-purpose tooling and without changing the sheet, it also being possible for the choice of accessories to be made to order, or for accessories to be substituted for other accessories, as desired or as required, thus making it possible where appropriate to obtain an installation that can be modified.

This objective has been achieved through the novel glass ceramic sheet according to the invention, intended in particular to be used as a surface of a furniture unit and/or as a worktop, and comprising, at least in one of its faces (in particular and advantageously its lower (when in the position of use) face), at least one connection element of a height (or thickness) less than or equal to 10 cm (preferably less than 6 cm, advantageously less than or equal to 4 cm), said connection element comprising at least one part that is magnetized or ((at least one part) made from a material) capable of being attracted by a magnet.

The connection element is an intermediate element of small thickness (less than or equal to 3 cm) capable of exhibiting a compact form (such as a stud or pin, in particular cylindrical, and of which the (external) cross section is inscribed for example in a circle of a diameter less than 2 cm) or in a form that is more extensive (in at least one direction parallel to the plane of the sheet, for example in the form of a rail), or yet again in the form of a coating or layer (or possibly a multi-layer coating). For preference, this connection element is formed of a cylindrical shell of small dimensions or of a layer (coat) (in particular of paint) as specified later on. For preference also, this element (and in particular the part thereof that is magnetized or (made of a material) capable of being attracted by a magnet) is formed from a material resistant to at least 70° C., and preferably resistant to at least 120° C.

This element comprises at least a part (it being possible for this part to be a portion, if appropriate a non-customized portion, of the element or one of the distinct components of the element) that is magnetized or made from a material capable of being attracted by a magnet. This part may in particular be formed or in the form of at least one permanent magnet or made from a hard magnetic material (which means to say a material that exhibits remanent or natural magnetization that remains present in the absence of an external magnetic field), or alternatively may be formed of a metallic or (ferro)magnetic part (or component) intended removably to receive a magnetized part of an attached element (which means to say of an element that is manufactured separately and then assembled), as specified later on. This magnetized or metallic or magnetic part of the connection element may in particular be an end of said element and/or where appropriate in a shell and/or matrix of said element. Where appropriate, the entirety of the element may be magnetized or made from a material capable of being attracted by a magnet (in other words, the connection element or each connection element may be formed at least in part, or even in its entirety, from at least one material or component that is magnetized (or from a magnet) or from at least one material or component capable of being attracted by a magnet).

For preference, the magnetized part (or component) of the connection element has a maximum energy product BHmax of at least 10 KJ/m$^3$ (measured in accordance with standard NF EN 62233). By way of nonlimiting example, this magnetized part of the connection element (or the magnet that forms part of said element) can be manufactured from compounds or alloys used in the production of powerful magnets, not liable to become demagnetized under the action of a weak field (such as exists in particular in induction hobs or with accessories of the wireless charger type), having a maximum energy product BHmax of at least 10 KJ/m$^3$, such as magnets made from neodymium or samarium or associated alloys (samarium-cobalt, neodymium-iron-boron, etc.). The magnetized part may for example be a magnet placed in or at one end of the connection element, as illustrated later on.

Alternatively, that part of the connection element (or the component) that is made from a material capable of being attracted by a magnet can be manufactured from various metal compounds or alloys, in particular based on iron, on nickel, on cobalt, manganese, etc. This part may be incorporated into the connection element or attached to or in the shell of said element, for example in the form of a (for example ferromagnetic) foil or of a layer deposited on the surface of said element. If appropriate, this part (or the entirety of the connection element) may be formed of magnetic particles (in particular of alloys based on iron oxides and/or ferrite) in a resin and/or a binder, deposited for example in the form of at least one coat of paint, this paint being, for example, a paint containing magnetic pigments (particularly at a content of at least 10% by weight), or being for example a magnetic paint marketed under the reference Julien by the AkzoNobel company, etc. The paint used may in particular advantageously be a paint containing from 10 to 50% of magnetic pigments (for example, pigments marketed under the reference Alnico FLNG12 by Epixen Industries), and containing for example from 40 to 80% of silicone resin, one or more fillers (for example up to 20%), and one or more additives such as one or more dispersants, one or more rheological additives, one or more deaerating agents, etc. The connection element may thus take the form of a coat of magnetic paint applied to the lower face of the sheet, it thus being advantageously possible for an attached element to be attached to any point on this coating, thus offering a great deal of flexibility, as illustrated later on.

For preference, the part that is magnetized or capable of being attracted by a magnet of the connection element occupies an area representing from 15 to 100% of the laid-flat surface-area of the connection element on its opposite side to the one in contact with the glass ceramic sheet, or even from 30 to 100% of said area. For example, it occupies from 15 to 100% (or even from 30 to 100%) of the area of the lower (when in the position of use) surface of the connection element, which where appropriate is essentially formed of the interior surface of the cavity of the element when this element is hollow. The magnetized part (where appropriate in the form of a magnet or magnetized constituent component attached, inserted or bonded in the shell of the element to form said element) may lie on the surface or where appropriate be concealed by a wall of the element which does not prevent its action, the part capable of being attracted by a magnet itself lying essentially at the surface. Where appropriate, the connection element may be entirely magnetized or capable of attracting a magnet.

The glass ceramic sheet developed comprises at least one, and, where appropriate, several, connection element(s) on at least one of its faces (preferably essentially or even only on the lower face (or face that is not visible in the position of use) of the sheet). Each connection element (capable of making the connection with an attached element (which means to say with an element manufactured separately and then assembled), particularly additional element, as explained later on) may be made in one or more parts (these parts then being connected and/or assembled to form said element), and may where appropriate comprise an outer shell or envelope (for example in the form of a cylindrical stud or pin, or of a U-section, T-section, L-section, etc. profile or rail), possibly comprising one or more hollowed parts and/or where appropriate may be equipped with one or more other external or internal constituent components (for example an internal magnet), as explained and illustrated later on.

In a first embodiment, the sheet comprises just one connection element, particularly in the form of a magnetized or metallic or magnetic coat or layer, where appropriate formed or metallic and/or magnetic particles in a binder, particularly in the form of a coat of paint, applied, directly or otherwise, to the relevant face of the sheet, or in the form of a foil (for example ferromagnetic), with a thickness for example comprised between 10 and 2000 μm, attached (for example by bonding) to the relevant face of the sheet.

In another embodiment, the sheet comprises several connection elements (for example in the form of pins or rails) as defined hereinabove, in particular positioned (more or less uniformly according to need) under the underside of the sheet, particularly distributed across the entirety of the lower face of the sheet. These elements are, for example, assembled to the sheet using an adhesive, such as an adhesive of the silicone, epoxy or cyanoacrylate type, particularly a thermosetting adhesive advantageously also having a coefficient of expansion (measured in accordance with standard ISO11359-2) of less than $900 \times 10^{-7}$ K$^{-1}$ between −40 and 80° C., and a shear strength of at least 1 N/mm$^2$ (measured in accordance with standard ISO4587, on aluminum), and preferably of at least 10 N/mm$^2$. This thermosetting adhesive allows the connectors to be fixed durably while offering a firm bond that offers better resistance to various stress loadings. Recourse to these particular adhesives in order to secure connection elements which themselves allow the desired equipment or accessories to be attached is particularly appropriate and effective, even in any heating regions there might be, while at the same time being simple to implement and economical.

When the sheet is intended to be equipped with heating elements, particularly with induction heating elements, at least part of the element or elements (for example the shell or envelope or exterior surface in the case of a stud or pin or of a rail) is preferably formed of refractory and/or non-magnetic material(s), resistant to at least 70° C., and preferably resistant to at least 120° C., for example of aluminum, or of graphite or silicon carbide, or of vermiculite or of refractory fibers, etc.

As mentioned previously, the connection element(s) are able to provide connection with an attached element, particularly additional element, whether this is directly an item of equipment or an accessory that is to be fitted or a receptacle capable of accepting various types of equipment or accessory. The dimensions, particularly the small thickness, of the connection elements according to the invention both allow the attached elements to be positioned near the sheet so that they can perform their function while at the same time limiting the risk of damage (scratching of the sheet as a result of potential manipulation of these elements or possible exposure to heat of electronic components, etc.), and, depending on the type of connection elements used, allow these elements to be positioned at various points on the sheet without presenting problems of space and in order to offer a modifiable structure. For preference, the connection element(s) have a height (or thickness) less than 6 cm, advantageously less than or equal to 4 cm, and of at least 5 mm, and, in the case of elements in the form of studs or pins, their external cross section is inscribed inside a circle of a diameter less than 3 cm, preferably less than 2 cm.

At least part (or even all) of the connection elements are thus able to accept, advantageously removably, at least part of a support(ing) element (such as a casing or plate) that is to accept one or more accessories to be associated or, where appropriate, are able to accept at least part of an accessory that is to be associated directly.

In particular, the element(s) to be attached (which are formed separately and assembled with the sheet using the connectors) are also each provided with at least one part that is magnetized or (made of a material) capable of being attracted by a magnet, this part being able to be attracted by the part that is magnetized or capable of being attracted by a magnet of the connection element (and being said to be "complementary" to said part of the connection element). The connection element(s) thus provided is(are) each able to accept, advantageously removably, at least the complementary part of an element that is to be added (or coupled). The element that is to be added is preferably a support element (such as a casing or plate) that is to accept one or more accessories that are to be associated, thus allowing various types of accessories, particularly commonplace accessories or accessories that do not have any special structure for assembly, to be added as required. Alternatively, the element that is to be added may also be directly an accessory, in this case having or designed to have a part that is complementary to the part that is magnetized or capable of being attracted by a magnet of the fixing element.

The accessories that are to be associated may for example be one or more heating elements (for example induction coils), one or more display systems, one or more electronic boards, one or more light sources, one or more control interfaces or housings, one or more sensors, one or more wireless chargers, etc.

The support element or elements used where appropriate to associate these accessories with the sheet may take the form of plate(s) or housing(s) or casing(s), for example made of aluminum or of plastic, it being possible for these plates or housings to be completely separated from the sheet and its connectors, or to be detached from one or more connectors, while at the same time remaining connected in another part to other connector(s), it also being possible where appropriate for this (these) support element(s) to form part of the sheet and/or connector(s).

Where appropriate, the connection elements may be associated in pairs or in groups, some of its elements (or first elements) being intended to each accept at least a first part (that is magnetized or capable of being attracted by a magnet) of the attached element(s) (supports and/or accessories), and other elements (second elements) being intended to each accept at least a second part—where appropriate also magnetized or capable of being attracted by a magnet—of the attached element(s), the connection elements associated in groups comprising where appropriate, and according to the same principle, third elements, or even fourth elements, etc., according to the envisaged mode of assembly of the elements that are to be added.

Aside from the force exerted between the part of the connection element and the complementary part of the element that is to be added (the magnet used or the magnetized part present, as the case may be, on the connection element or on the complementary part of the element that is to be added, preferably having a maximum energy product BHmax of at least 10 KJ/m$^3$, as indicated previously in the description of the magnets that can be used), an immobilizing means (which if appropriate can be removed if need be) may be provided (and likewise form part of the connection element) so as to hold the added element more securely once it has been positioned on (part of the surface of) the connection element. The immobilizing means may in particular exert a force, particularly in the direction of (oriented toward) the glass ceramic sheet, this force preferably being perpendicular to the direction of said force exerted between the relevant connection element and the relevant element that is to be added.

The immobilizing means may for example be formed by the combination of a pressing element such as a spring, on the outside of or inside a cylindrical shell that (in part) forms the connection element, this shell containing for example a magnet, with a stop element, such as a pin, keeping the spring in compression once the added element has been positioned on the magnetized part of the connection element, the removal of the pin subsequently potentially allowing the added element to be extracted if need be.

The glass ceramic sheet to which the connection element (s) are fixed is advantageously monolithic (or monoblock or made as a single piece), particularly essentially planar, and has a thickness less than 15 mm, particularly less than 12 mm, in particular less than or equal to 6 mm, and a coefficient of expansion less than $30\times10^{-7}$ K$^{-1}$ between 20 and 400° C. (and preferably less than $13\times10^{-7}$ K$^{-1}$ between 20 and 400° C.).

The present invention also relates to an item of furniture and/or household equipment incorporating the sheet according to the invention, and in particular to a work table (or worktop) or a furniture unit, said item of equipment being formed by at least said sheet (in particular a sheet of large dimensions, particularly having a surface area greater than or equal to 0.7 m$^2$, as specified later on) positioned (particularly horizontally) on one or more support elements (the carcass of a furniture unit, support leg(s), etc.), so as to offer a stable surface. In particular, the present invention relates to a table or a furniture unit comprising a surface or plate, particularly of large dimensions, formed by the sheet according to the invention and able to allow simultaneous or successive performance of various activities and/or supporting of objects. This furniture unit may for example be a central island in a room, for example a kitchen island, or any work table or worktop for various uses, for example a lab table, a table or a coffee table, alternatively a unit of the side-table, credenza type, an item of storage furniture, a counter top, etc.

In particular, the invention relates to an item of furniture and/or household equipment in which the sheet occupies most (more than 50% of the surface of the face on which it is located, preferably more than 80%, in particular more than 90%) and preferably all (thus forming a continuous surface) of one face of said item of furniture and/or household equipment, particularly the top (when in the position of use), in particular horizontal, face of said item of furniture and/or household equipment, so as to offer a continuous stable surface capable of allowing simultaneous or successive performance of activities (such as work, play, reading, etc.), supporting of objects (such as papers, computers, vases, crockery, etc.), and possibly the preparation or cooking or reheating of food in suitable vessels, and/or any other use connected with the purpose for which the unit is intended. The sheet used is particularly and advantageously monolithic and has a thickness less than 15 mm, a coefficient of expansion less than $30\times10^{-7}$ K$^{-1}$ between 20 and 400° C., and a surface area greater than or equal to 0.7 m², for use as a worktop or the large surface of a furniture unit, as detailed later on.

The presence of the connectors and accessories advantageously on the lower face makes it possible where appropriate to hide unattractive elements, to offer a visible surface with easy upkeep and to guarantee better durability of the accessories of the sheet, etc. The glass ceramic sheet thus offers a surface that is predominantly continuous/uniform/free of connections, attractive, and of easy upkeep. It may be provided with decorative or functional coatings of small thickness (in particular of the order of a few tens of nanometers to a few hundred microns, or even more), for example made of enamel, paint, thin layers, etc., and/or with other elements, which may or may not be attached to the aforementioned connectors.

Where appropriate, the sheet may have a surface area (which corresponds to the product of its length and its width) for its face of largest dimensions which is intended to be visible and act as a support for (household or work) items, with dimensions greater than 0.4 m², in particular greater than 0.7 m², or even greater than 1 m², particularly greater than or equal to 2 m², for use as a worktop or the surface of a furniture unit. The sheet also preferably in this case has one and/or other of the following characteristics (the limits given being included): Young's modulus of between 80 and 100 GPa (measured according to the ASTM C 1259 standard), flexural strength of between 110 and 220 MPa (measured by a ring-on-tripod test, on a 70 mm×70 mm×4 mm plate, the sample resting on three 9.5-mm diameter balls positioned at the vertex of an equilateral triangle inscribed in a 40-mm diameter circle, a force being applied to the center of the sample by a 10-mm diameter ring with an advance of 5 mm/min, the results being interpreted with the Weibull model described in: "A statistical distribution of strength of Materials", Royal Swedish Institute For Engineering Research, W. Weibull, Stockholm 1939, 1-45, the data obtained, also referred to as a "scale factor", revealing the average rupture stress resulting from the analysis by the Weibull method of the flexural modulus of rupture (MOR) measurements, being expressed in MPa), thermal conductivity of less than 2 W/m·K (measured according to the DIN 51936 standard), resistance to thermal shocks of between 250° C. and 700° C., density of between 2.3 and 2.7, resistance to acids of between 0 and 2 mg/cm² (measured according to the DIN12116 standard), and resistance to bases of between 0 and 1 mg/cm² (measured according to the ISO 695 standard).

The glass ceramic sheet used is preferably flat (or predominantly or virtually flat) and in particular has a flatness (height between the highest point and the lowest point of the substrate, with respect to the mean plane of the substrate, excluding any possible deliberate deformations produced on the substrate for esthetic or functional purposes) of less than 0.1% of the diagonal of the substrate, and preferably of less than 3 mm, in particular of less than 2 mm and in particular of less than 1 mm, or even of about zero, depending on the size/surface area/diagonal of the substrate, the flatness being measured using a SurFlat waviness meter sold by Visuol. It is generally of geometric shape, in particular rectangular, indeed even square, or even circular or oval, etc., and generally exhibits a face which is "upper" (face which is visible) in the position of use, another face which is "lower" (generally hidden, in a framework or carcass) in the position of use, and an edge face (or edge or thickness). The upper face is generally flat and smooth but may also exhibit at least one protruding zone and/or at least one recessed zone and/or at least one opening and/or beveled edges, etc., these variations in shape advantageously constituting continuous variations in the sheet (with no change in materials or joins). The lower face is preferably smooth, or indeed provided with bumps (in which case the connectors can be bonded using an adhesive which then also acts as a filler material if appropriate, or the magnetic paint used where appropriate as a connector can act as a filler material, or the sheet may comprise another suitable filler material such as a resin or a self-leveling film).

The thickness of the glass ceramic sheet is generally at least 2 mm, in particular at least 2.5 mm, particularly of the order of 3 to 15 mm. The glass ceramic may be in a dark color (black, dark brown) or a pale color (white, cream) and may be translucent or opaque or transparent depending on the desired use and the desired look. It is in particular a lithium aluminosilicate glass ceramic. It may in particular be refined with arsenic (that is to say, have (a parent glass with) a composition comprising of the order of 0.5% to 1.5% by weight of arsenic oxide (expressed as $As_2O_3$)) or may not be refined with arsenic (in particular having a content of arsenic oxides of less than 0.2%, in particular of less than 0.1%, or even zero) or refined with tin or refined with sulfide(s), and may be obtained by rolling or by the float process.

As indicated hereinabove, the sheet may where appropriate comprise various functional and/or decorative coatings, in particular from among those generally used with glass ceramics, for example coatings based on enamel, on paint, on thin (for example metal, dielectric, etc.) layer(s), etc. For example, one of the faces may comprise one or more enamel layers or one or more enamel patterns having a decorative purpose and/or in order to signal one or more elements (displays, etc.) and/or acting as masking (for example to prevent light sources from being seen directly) and/or for other functions (as light extractor or to render illumination uniform, etc.). The sheet may also be provided with a functional layer giving it one or more additional properties, such as scratch resistance, mechanical strength, non-marking, overspill prevention, etc., it being possible in particular for the coating or coatings to be on the visible face or on the opposite face, depending on the type of coating and the desired function.

The sheet (or the furniture unit incorporating said sheet) may be equipped, particularly and advantageously via the connectors, with various elements (or accessories) allowing various uses so as in particular to form an interactive and modifiable furniture unit or worktop.

For example, it may be equipped with one or more light sources, in particularly formed by light-emitting diodes and intended for example to embody (render visible) one or more regions or one or more elements or displays of the sheet, in particular by transmission of light through the sheet. These sources may in particular make it possible to display controls (in the form of keys, logos, or even keypads, etc.,) which can for example be activated by contact on the surface of the sheet (using, for example, sensors located under the surface and which may likewise be attached using the connectors) or remotely (in particular by wireless communication), indeed even by simple movement of the hand (by sensors located, if appropriate, on the outside and which record the movement, for example by triangulation, in order to convert it, in particular using a suitable algorithm and a suitable interface, into the activation of a function, for example), or, if appropriate, by placing a predetermined object at a predetermined location on the sheet. The light source(s) may also make it possible to display decorations or various data (to display, for example, computer pages, cooking recipes, etc.,) downloaded, for example, by wireless communication using an appropriate interface and projected or transmitted from the light sources onto the surface of the sheet.

The sheet (or the furniture unit incorporating said sheet) may also be equipped with one or more heating elements, such as induction coils, radiant elements, which also can be actuated in various ways as described for the light sources, and may also be equipped with communication interface(s) with at least one adjacent element (for example light sources or heating elements) and/or if appropriate with at least one external element, for example with an external module for wireless communication, said interface(s) being for example a control unit, a tablet or a touch-screen, a system of the Bluetooth, WLAN, wifi, RFID chip, Lifi, etc. type.

The sheet (or the furniture unit) may also be equipped with other elements, such as one or more waveguides, and with various other components, particularly electrical and/or electronic components, such as a charger (for example for a telephone, induction coil, etc.), one or more leads, an audible or vibrating component (which for example signals that an object of the saucepan type is approaching), etc.

The solution afforded by the present invention is particularly advantageous, as mentioned hereinabove. The dimensions of the connection element or elements and the possibility of positioning them, or of positioning the elements that are to be associated, at various locations, combined with the choice of materials used and the options for associating them with removable elements for attaching the accessory or accessories to be coupled at a distance that allows them to perform whatever function they might have without the risk of damage to said accessories by rubbing or by heat make it possible to offer a solution to the stated problem that is suitable for all types of glass ceramic sheet and make it possible to envision fitting and/or removing various types of accessories without the need for complex installations or tooling and without the need to handle the sheets, particularly those of significant dimensions and weight. The product developed according to the invention thus meets the desired objective by proposing a mode of assembly that allows various types of elements to be connected at various points on the sheet, removably where appropriate, without the installation presenting problems of space or of interference with certain accessories combined with the sheet (such as any heating elements there might be, be these radiant or of the induction type), and while at the same time allowing the associated accessories to perform their function in combination with the sheet (such as to illuminate heating regions or to display data using elements added underneath the sheet, etc.), the proposed solution also allowing the accessories to be exchanged as required or according to the intended purpose of the sheet.

The sheet according to the invention is manufactured in particular from glass ceramic sheets, particularly of large dimensions, obtained by ceramization, in particular by bonding the connection element(s) to the surface of the glass ceramics using a thermosetting adhesive, and/or by applying a coat of magnetic paint to the face, particularly the lower face, of the sheet.

For the record, glass ceramic sheets are generally manufactured as follows: glass with the composition chosen for forming the glass ceramic is melted in a melting furnace, the molten glass is then rolled to give a standard ribbon or sheet by passing the molten glass between forming rollers, and the glass ribbon is cut to the desired dimensions. The sheets, which may or may not be already cut, are then ceramized in the way known per se, ceramization consisting in firing the sheets according to the chosen temperature profile in order to convert the glass into the polycrystalline material referred to as "glass ceramic" the expansion coefficient of which is zero or near zero and which is resistant to thermal shock of as much as 750° C. (or indeed even more). Ceramization generally comprises a step in which the temperature is raised progressively to the nucleation domain, generally situated around the glass transformation domain, a step in which the nucleation range is crossed in a few minutes, a further progressive increase in temperature up to the ceramization hold temperature, holding the ceramization hold temperature for several minutes, followed by rapid cooling down to ambient temperature.

In order to obtain large-sized sheets according to the invention, particularly sheets with a surface area greater than 0.7 m$^2$, the speed of passage during the ceramization cycle is preferentially reduced by at least 25%, preferably by at least 50%, or the length of the ceramization lehr or the residence time in said lehr is increased by at least 25%, preferably by at least 50% with respect to the speed, length or residence time respectively that are optimal or common practice for obtaining a glass ceramic substrate that has a surface area smaller than 0.4 m$^2$.

If appropriate, the process also comprises a cutting operation (generally before ceramization), for example with a water jet, mechanical scoring with a cutting wheel, etc., followed by a shaping operation (grinding, beveling, etc.). The process can also comprise a step of rolling or sag bending in order to form specific reliefs.

Other advantageous features and details of the invention will emerge below from the description of nonlimiting embodiments of the invention, with reference to the appended drawings, in which:

FIG. 1b depicts an alternative form of the embodiment of FIG. 1a;

FIG. 1c depicts another alternative form of the embodiment of FIG. 1a;

FIG. 2a depicts a view in perspective (viewed from above) of a sheet according to the invention according to a second exemplary embodiment of the invention;

FIG. 2b depicts a schematic partial cross section of said sheet depicted in FIG. 2a when a support element that is to accept one or more pieces of equipment or accessories that are to be associated is added and fixed to the sheet using the connection element (which in this embodiment is formed by a coat of magnetic paint);

FIG. 3a depicts a view in perspective (viewed from above) of a sheet according to the invention according to a third exemplary embodiment of the invention;

FIG. 3b depicts a schematic partial cross section of said sheet depicted in FIG. 3a when a support element that is to accept one or more pieces of equipment or accessories that are to be associated is added and fixed to the sheet using a connection element (which in this embodiment is formed by a rail equipped with a magnetized component).

The same references are used throughout the figures where appropriate to denote the same types of element.

In each of the aforementioned figures, the sheet (1) according to the invention is a monolithic sheet of glass ceramic (for example a sheet of the kind marketed by the Eurokera company under the reference KeraBlack+), this sheet having an upper face and a lower face which are smooth, and having for example a thickness of 6 mm and a surface area of 1.17 m², and being in particular obtained by a procedure like that of patent application WO 2012156444, reducing the speed of passage through the ceramization lehr by 50% in order to obtain said large-sized sheet without any flatness defects.

Figure 1A:
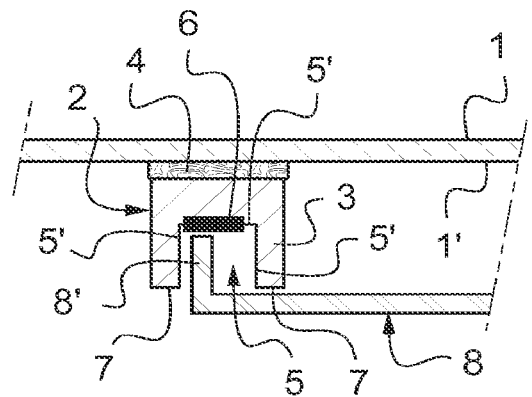
FIG. 1a depicts a schematic cross section of a first exemplary embodiment of a sheet according to the invention (with an element in the form of a stud enclosing a magnet or a part capable of being attracted by a magnet)
Figure 1B:
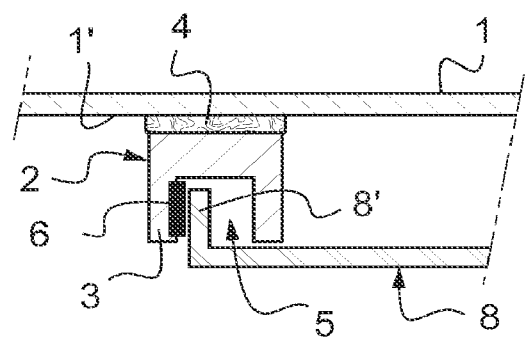
Figure 1C:
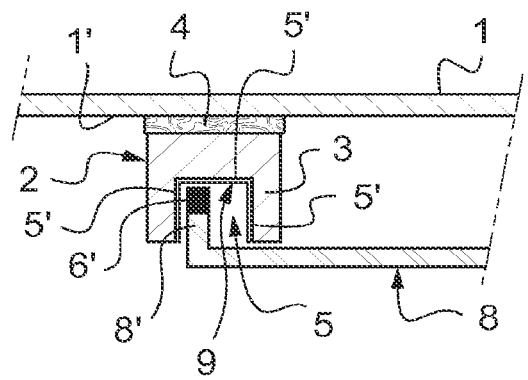

In the first embodiment illustrated in FIGS. 1a to 1c, the glass ceramic sheet (1), in particular intended to act as the surface of a furniture unit or as a large worktop, is equipped, on its lower face (1'), with several identical or similar connection elements (2) (just one element being depicted here in the figures) each one comprising at least one shell or cylindrical body (3), each connection element being bonded under the underside (or lower face in the position of use) of the sheet by means of a thermosetting adhesive (4) that has a coefficient of expansion of less than $900 \times 10^{-7}$ $K^{-1}$ between −40 and 80° C. and a shear strength on aluminum of between 10 and 50 N/mm², such as an epoxy-type adhesive marketed by the Henkel company under the reference Loctite EA 9492, or a cyanoacrylate-type adhesive marketed by the Henkel company under the reference Loctite 480.

Each connection element (2) is formed of at least one cylindrical body (3), which in particular is hollow or part-hollow, 0.5 to 3 cm in diameter, and 0.5 to 3 cm in height, for example made from a non-magnetic material such as aluminum, graphite, etc., and of at least one magnet (6), fixed (for example by bonding or insetting) in the cavity (5) at the base of the connector (2). The magnet is made for example from an alloy of samarium and cobalt or from an alloy of neodymium, iron and boron, and preferably covers from 15 to 100% (or even from 30 to 100%) of the area of the lower surface of the pin (formed by unfolding essentially of the total interior surface (5') of the cavity and of the lower surfaces 7 of the adjacent walls).

The support element intended to accept one or more pieces of equipment or accessories takes for example the form of a casing or housing (not depicted) essentially made of aluminum or of plastic, but also exhibiting a lateral part (8) or flange with an end (8') able to become lodged in the cavity (5) of the connection element, this end being formed for example from a ferromagnetic material and forming a complementary part to the magnetized part (6) of the element so as to allow the removable attachment of the support element (and of the accessories or equipment items it contains) to the connection element and, thereby, to the sheet, through the force of attraction exerted between the magnet/the magnetized part and the ferromagnetic end of the housing.

In the embodiment of FIG. 1a, when the support element bearing the equipment items or accessories is being mounted, the end (8') of the support element is introduced into the cavity (5) of the connector (2) where it is attracted by the magnet with a force exerted in the direction of the sheet. Should it prove necessary to remove or change equipment items, the support element can be removed by exerting a force in the opposite direction.

In the alternative form in FIG. 1b, the magnet/the magnetized part (6) is this time positioned in such a way that the force exerted between the magnet and the end (8') is perpendicular to the direction of insertion.

In the alternative form in FIG. 1c, the magnet/the magnetized part (6) is situated this time on the support element associated with the connection element, the connection element in this instance having a cavity interior surface (5') made of a ferromagnetic material, for example said interior surface being coated with a ferromagnetic foil (9), bonded if appropriate to said surface, or with a paint based on magnetic particles.

In the embodiment illustrated in FIGS. 2a and 2b, the glass ceramic sheet (1), in particular intended to act as the surface of a furniture unit or a large worktop, is equipped, on its lower face (1'), with a connection element in the form of a coat of magnetic paint of a thickness of between 1 and 200 µm, or of a ferromagnetic foil (12) with a thickness of between 10 and 2000 µm, covering the entire lower face of the sheet. The paint is, for example, a paint containing 50% by weight of silicone resin, marketed under the reference DC 249 by the company Dow Corning, 30% of magnetic pigments marketed under the reference Alnico FLNG12 by Epixen Industries, 10% of fillers marketed under the reference Talc 10MO by the company Omya, and 2% of dispersants marketed under the reference Disperbik 110 by the company Byk GmbH, 1% of rheological additives marketed under the reference Aerosil 300 by the company Evonik, 2% of deaerating agents marketed under the reference Byk 306 by the company Byk GmbH, and 3% of xylene.

The support element (10) for example takes the form of an essentially aluminum or plastic rectangular casing or housing measuring 19×26 cm and with a (side wall) thickness of 12 mm, provided on its upper face with a magnetized part (11), this support element being intended to accept one or more pieces of equipment or accessories (not depicted) such as induction coils, an electronic unit, etc. This housing can be fixed under the sheet at any point (as illustrated in particular in FIG. 2a where two support elements are positioned at arbitrary locations), fixing being by means of the attraction exerted between the magnetized part (11) of the support element and the magnetic paint or foil under the underside of the sheet, thus offering a great deal of flexibility in terms of the positioning of the added elements, these added elements furthermore being fixed removably.

In the embodiment illustrated in FIGS. 3a and 3b, the glass ceramic sheet (1) is this time equipped, on its lower face (1'), with three similar or identical connection elements (13) in the form of, for example, U-section (as depicted), L-section or T-section aluminum rails of a thickness of between 0.5 and 3 cm, and of a length for example of between 1 and 30 cm, or even of a length corresponding to that of the sheet, each connection element or rail enclosing a magnetized bar (14) on all or part of its length.

The support element (10) takes, for example, the form of a rectangular casing or housing measuring 480×550 mm, provided at least on its upper face (15) with a part formed for example of a ferromagnetic material and thus allowing the removable attachment of the support element (and of the accessories or equipment—not depicted—that it contains) to the connection element and, thereby, to the sheet, via the force of attraction exerted between the magnet/the magnetized part and the ferromagnetic part of the housing. The housing can be fixed under the sheet at various points along the rails, attachment taking place via the attraction exerted between the magnetized part (14) of each relevant connection element and the ferromagnetic part of the relevant support element. As an alternative, each rail, for example made of a non-magnetic material such as aluminum or graphite, can be provided with a coating, for example at its base, or in its interior cavity, in the form of a magnetic paint or foil, the support element then having a magnetized part like that of FIG. 2b.

The sheet according to the invention may in particular be used to advantage to produce a new range of cooking devices or furniture units.

The invention claimed is:

1. A glass ceramic sheet connection system for at least one of a furniture unit and a worktop, comprising:

a plurality of connection elements of a height less than or equal to 10 cm, each of said connection elements including a cavity formed by a lower surface of each of the connection elements, each of the connection elements including at least one part that is a magnet or a magnetized part capable of being attracted by a magnet, the at least one part being located within the cavity, wherein the connection elements are located on a lower face of a glass ceramic sheet, wherein the at least one part of each of the connection elements is configured to be removably engaged with at least one complementary part of a support element, the support element being located on a same side of the glass ceramic sheet as the connection element, wherein the at least one complementary part is a magnet or a magnetized part capable of being attracted by a magnet, wherein the complementary part of the support element is in direct contact with the connection element located within the cavity.

2. The glass ceramic sheet connection system as claimed in claim 1, wherein each of said connection elements is a cylindrical stud or pin, and of which the cross section is inscribed in a circle of a diameter less than 3 cm, or a profile section.

3. The glass ceramic sheet connection system as claimed in claim 1, wherein each of said connection elements element or said part that is a magnet or a magnetized part capable of being attracted by a magnet, of the each of connection elements is in the form of a coating or layer.

4. The glass ceramic sheet connection system as claimed in claim 1, wherein said part that is a magnet or a magnetized part capable of being attracted by a magnet of each of the connection elements occupies an area representing from 15% to 100% of a surface-area of that respective connection element on its opposite side to the one in contact with the class ceramic sheet.

5. The glass ceramic sheet connection system as claimed in claim 1, wherein
the support element is configured to accept one or more accessories to be associated with the support element.

6. The glass ceramic sheet connection system as claimed in claim 5, wherein the magnet or the magnetized part of the connection element or the magnet or magnetized part of the support element that is to be added, has a maximum energy product (BHmax) of at least 10 KJ/m$^3$.

7. The glass ceramic sheet connection system as claimed in claim 6, wherein the support element(s) with which the glass ceramic sheet is equipped or intended to be equipped are of the casing or plate type, and the accessory or accessories with which the glass ceramic sheet is equipped or intended to be equipped are in particular of the heating element(s), display system(s), electronic board(s), audible or vibrating component(s), light source(s), control unit(s) or interface(s) or sensor(s) type.

8. The glass ceramic sheet connection system as claimed in claim 1, wherein said glass ceramic sheet is a monolithic sheet having a thickness of less than 15 mm, an expansion coefficient of less than $30 \times 10^{-7}$ K$^{-1}$ between 20° C. and 400° C., and a surface area of greater than or equal to 0.7 m$^2$.

9. An item of at least one of furniture and household equipment, comprising:
at least one glass ceramic sheet connection system as claimed in claim 1.

10. The item of at least one of furniture and household equipment as claimed in claim 9,
wherein said glass ceramic sheet occupies at least 50% of a top face of said item of at least one of furniture and household equipment, and wherein the glass ceramic sheet is mounted on one or more support elements so as to offer a continuous stable surface intended for various uses.

11. The item of at least one of furniture and household equipment, as recited in claim 9, wherein the item is a worktop or furniture unit.

12. The glass ceramic sheet connection system as claimed in claim 1, wherein each of said connection elements or said part, is in the form of a coat of paint formed from magnetic particles or in the form of a ferromagnetic foil.

13. A glass ceramic sheet connection system for at least one of a furniture unit and a worktop, comprising:
at least one connection element of a height less than or equal to 10 cm, said connection element including a cavity formed by a lower surface of the connection element, the connection element including at least one part that is a magnet or a magnetized part capable of being attracted by a magnet, the at least one part being located within the cavity, wherein the connection element is located on a lower face of a glass ceramic sheet, wherein the at least one part of the connection element is configured to be removably engaged with at least one complementary part of a support element, the support element being located on a same side of the glass ceramic sheet as the connection element, wherein the at least one complementary part is a magnet or a magnetized part capable of being attracted by a magnet, wherein the complementary part of the support element is in direct contact with the at least one part of the connection element located within the cavity, and wherein the glass ceramic sheet is a monolithic sheet having a thickness of less than 15 mm, an expansion coefficient of less than $30 \times 10^{-7}$ K$^{-1}$ between 20° C. and 400° C., and a surface area of greater than or equal to 0.7 m$^2$.

14. The glass ceramic sheet connection system as claimed in claim 13, wherein said connection element is a cylindrical stud or pin, and of which the cross section is inscribed in a circle of a diameter less than 3 cm, or a profile section.

15. The glass ceramic sheet connection system as claimed in claim 13, wherein a plurality of connection elements are positioned under the lower face of the glass ceramic sheet.

16. The glass ceramic sheet connection system as claimed in claim 13, wherein said connection element or said part that is a magnet or a magnetized part capable of being attracted by a magnet, of the connection element is in the form of a coating or layer.

17. The glass ceramic sheet connection system as claimed in claim 13, wherein said part that is a magnet or a magnetized part capable of being attracted by a magnet of the connection element occupies an area representing from 15% to 100% of a surface-area of the connection element on its opposite side to the one in contact with the glass ceramic sheet.

18. The glass ceramic sheet connection system as claimed in claim 13, wherein the support element is configured to accept one or more accessories to be associated with the support element.

19. The glass ceramic sheet connection system as claimed in claim 13, wherein said connection element or said part, is in the form of a coat of paint formed from magnetic particles or in the form of a ferromagnetic foil.

* * * * *

UNITED STATES PATENT AND TRADEMARK OFFICE
CERTIFICATE OF CORRECTION

PATENT NO. : 11,350,739 B2
APPLICATION NO. : 16/095571
DATED : June 7, 2022
INVENTOR(S) : Nicolas Roux et al.

It is certified that error appears in the above-identified patent and that said Letters Patent is hereby corrected as shown below:

On the Title Page

Item (73), the Assignee's city of residence is incorrect. Item (73) should read:
-- (73) Assignee: EUROKERA S.N.C., Chateau Thierry (FR) --

Signed and Sealed this
Nineteenth Day of July, 2022

Katherine Kelly Vidal
*Director of the United States Patent and Trademark Office*